(12) United States Patent
Ho et al.

(10) Patent No.: US 11,580,328 B1
(45) Date of Patent: Feb. 14, 2023

(54) SEMANTIC LABELING OF POINT CLOUDS USING IMAGES

(71) Applicants: Huy Tho Ho, San Jose, CA (US); Jingwei Wang, San Jose, CA (US); Kjell Fredrik Larsson, San Jose, CA (US)

(72) Inventors: Huy Tho Ho, San Jose, CA (US); Jingwei Wang, San Jose, CA (US); Kjell Fredrik Larsson, San Jose, CA (US)

(73) Assignee: APPLE INC., Cupertino, CA (US)

( * ) Notice: Subject to any disclaimer, the term of this patent is extended or adjusted under 35 U.S.C. 154(b) by 164 days.

(21) Appl. No.: 17/188,079

(22) Filed: Mar. 1, 2021

Related U.S. Application Data

(63) Continuation of application No. 16/869,093, filed on May 7, 2020, now Pat. No. 10,936,908, which is a
(Continued)

(51) Int. Cl.
*G06K 9/62* (2022.01)
*G06T 7/11* (2017.01)
*G06V 20/64* (2022.01)

(52) U.S. Cl.
CPC .............. *G06K 9/6256* (2013.01); *G06T 7/11* (2017.01); *G06V 20/64* (2022.01); *G06T 2207/10028* (2013.01)

(58) Field of Classification Search
CPC .................... G06K 9/6256; G06T 7/11; G06T 2207/10028; G06V 20/64
See application file for complete search history.

(56) References Cited

U.S. PATENT DOCUMENTS

| 9,542,626 B2 | 1/2017 | Martinson et al. |
| 10,650,278 B1 * | 5/2020 | Ho .................. G06V 10/774 |

(Continued)

FOREIGN PATENT DOCUMENTS

| CN | 111209915 A * | 5/2020 | |
| WO | WO-2017199141 A1 * | 11/2017 | ............... G06T 7/30 |

OTHER PUBLICATIONS

Vinett, V., et al., "Fast Minimum Spanning Tree For Large Graphs on the GPU", Proc. of the Conference on High Performance Graphics 2009, pp. 167-171, New Orleans, LA (6 pp).
(Continued)

*Primary Examiner* — Charles T Shedrick
(74) *Attorney, Agent, or Firm* — Young Basile Hanlon & MacFarlane, P.C.

(57) ABSTRACT

Systems and methods for semantic labeling of point clouds using images. Some implementations may include obtaining a point cloud that is based on lidar data reflecting one or more objects in a space; obtaining an image that includes a view of at least one of the one or more objects in the space; determining a projection of points from the point cloud onto the image; generating, using the projection, an augmented image that includes one or more channels of data from the point cloud and one or more channels of data from the image; inputting the augmented image to a two dimensional convolutional neural network to obtain a semantic labeled image wherein elements of the semantic labeled image include respective predictions; and mapping, by reversing the projection, predictions of the semantic labeled image to respective points of the point cloud to obtain a semantic labeled point cloud.

20 Claims, 12 Drawing Sheets

Related U.S. Application Data continuation of application No. 16/021,525, filed on Jun. 28, 2018, now Pat. No. 10,650,278.

(60) Provisional application No. 62/535,457, filed on Jul. 21, 2017.

(56) References Cited

U.S. PATENT DOCUMENTS

| | | | | |
|---|---|---|---|---|
| 10,839,530 | B1* | 11/2020 | Berger | G06T 15/08 |
| 11,004,202 | B2* | 5/2021 | Tchapmi | G06K 9/00 |
| 2017/0220887 | A1* | 8/2017 | Fathi | G06V 20/10 |
| 2017/0358087 | A1* | 12/2017 | Armeni | G06T 7/187 |
| 2018/0161986 | A1 | 6/2018 | Kee et al. | |
| 2019/0295266 | A1* | 9/2019 | Fan | G06T 7/37 |
| 2020/0025935 | A1 | 1/2020 | Liang et al. | |
| 2022/0101103 | A1* | 3/2022 | Fatemi | G06N 3/0454 |
| 2022/0180183 | A1* | 6/2022 | Hong | G06F 16/244 |

OTHER PUBLICATIONS

Felzenszwalb, P., et al., "Efficient Graph-Based Image Segmentation", International Journal of Computer Vision, vol. 59(2), pp. 167-181, 2004, (26 pp).

Dai, A., et al., "3DMV: Joint 3D-Multi-View Prediction for 3D Semantic Scene Segmentation", Cornell University Library, Computer Science, Computer Vision and Pattern Recognition, https://arxiv.org/abs/1803.10409, Mar. 28, 2018, (20 pp).

\* cited by examiner

SEMANTIC LABELING OF POINT CLOUDS USING IMAGES

CROSS-REFERENCE TO RELATED APPLICATION(S)

This application is a continuation of U.S. patent application Ser. No. 16/869,093, which was filed on May 7, 2020, which is a continuation of U.S. patent application Ser. No. 16/021,525, which was filed on Jun. 28, 2018, which claims the benefit of U.S. Provisional Application No. 62/535,457, filed on Jul. 21, 2017. The content of the foregoing applications is incorporated herein by reference in its entirety for all purposes.

TECHNICAL FIELD

This disclosure relates to semantic labeling of point clouds using images.

BACKGROUND

Sensors mounted on vehicles have been used to gather data for generating maps of streets and their vicinity. For example, some interactive maps include images of locations captured from vehicles.

SUMMARY

Disclosed herein are implementations of semantic labeling of point clouds using images.

In a first aspect, the subject matter described in this specification can be embodied in systems that include a data processing apparatus and a data storage device storing instructions executable by the data processing apparatus that upon execution by the data processing apparatus cause the data processing apparatus to perform operations comprising: obtaining a point cloud, in three spatial dimensions, that is based on lidar data reflecting one or more objects in a space; obtaining an image, in two spatial dimensions, that includes a view of at least one of the one or more objects in the space; determining a projection of points from the point cloud onto the image; generating, using the projection, an augmented image that includes one or more channels of data from the point cloud and one or more channels of data from the image; inputting the augmented image to a two dimensional convolutional neural network to obtain a semantic labeled image wherein elements of the semantic labeled image include respective predictions; and mapping, by reversing the projection, predictions of the semantic labeled image to respective points of the point cloud to obtain a semantic labeled point cloud.

In a second aspect, the subject matter described in this specification can be embodied in methods that include obtaining a point cloud, in three spatial dimensions, that is based on lidar data reflecting one or more objects in a space; obtaining an image, in two spatial dimensions, that includes a view of at least one of the one or more objects in the space; determining a projection of points from the point cloud onto the image; generating, using the projection, an augmented image that includes one or more channels of data from the point cloud and one or more channels of data from the image; inputting the augmented image to a two dimensional convolutional neural network to obtain a semantic labeled image wherein elements of the semantic labeled image include respective predictions; and mapping, by reversing the projection, predictions of the semantic labeled image to respective points of the point cloud to obtain a semantic labeled point cloud.

In a third aspect, the subject matter described in this specification can be embodied in a non-transitory computer-readable storage medium including program instructions executable by one or more processors that, when executed, cause the one or more processors to perform operations. The operations including: obtaining a point cloud, in three spatial dimensions, that is based on lidar data reflecting one or more objects in a space; obtaining an image, in two spatial dimensions, that includes a view of at least one of the one or more objects in the space; determining a projection of points from the point cloud onto the image; generating, using the projection, an augmented image that includes one or more channels of data from the point cloud and one or more channels of data from the image; inputting the augmented image to a two dimensional convolutional neural network to obtain a semantic labeled image wherein elements of the semantic labeled image include respective predictions; and mapping, by reversing the projection, predictions of the semantic labeled image to respective points of the point cloud to obtain a semantic labeled point cloud.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
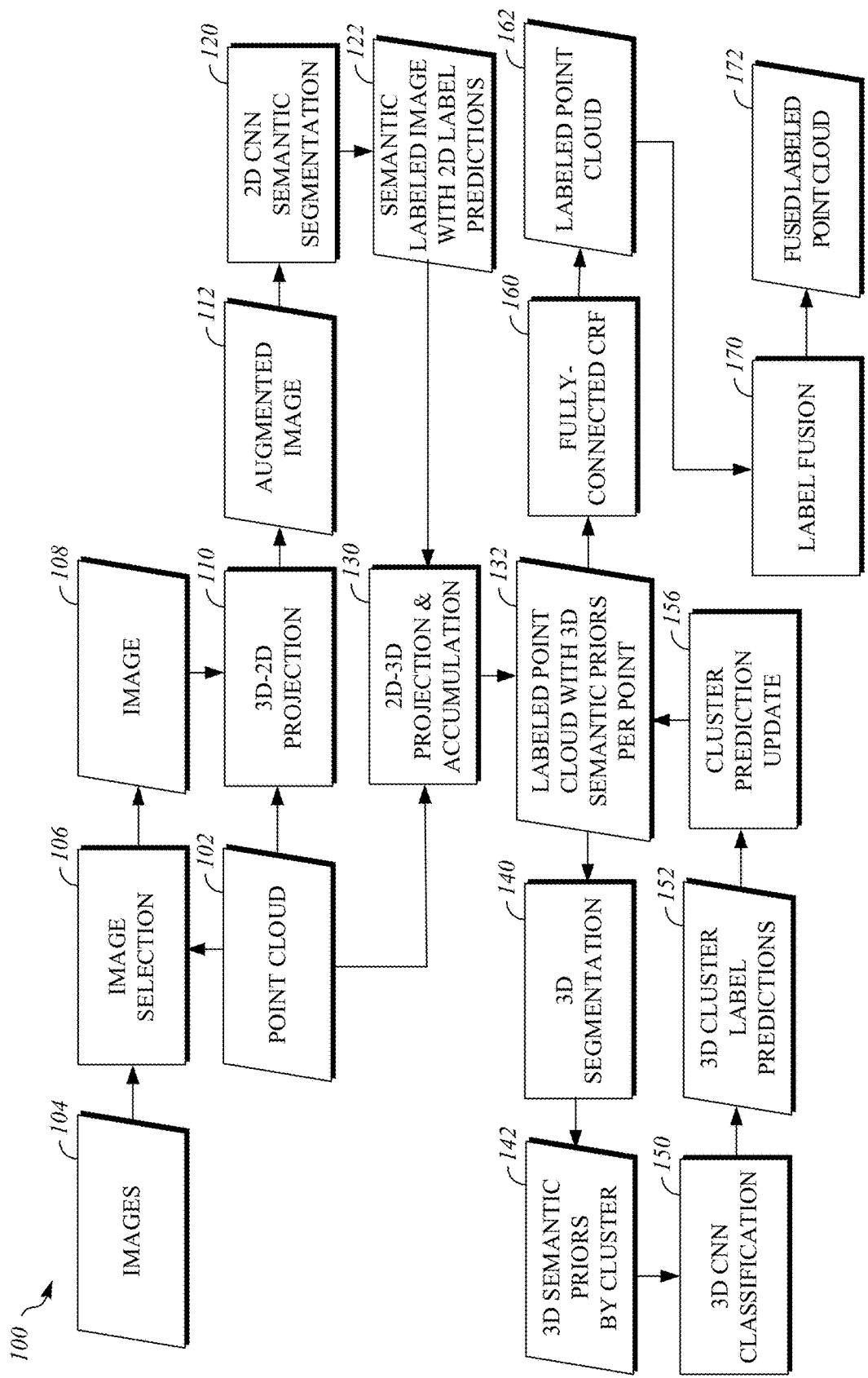
FIG. 1 is a block diagram of a system for semantic labeling of point clouds using images.

Systems and methods for performing semantic segmentation of three dimensional point clouds based on two dimensional images of the space represented by the point cloud that are augmented with channels of data derived from points of the point cloud that are projected onto the images. Predictions of classification labels for the pixels of the augmented image are determined using a two dimensional convolutional neural network and mapped, by reversing the projection used to generated the augmented image, back to the corresponding points of the point cloud to generate a labeled point cloud.

Multiple images of the space captured from different location and/or at different times may be selected for processing to provide multiple (e.g., at least two) views of the points in the point cloud while reducing computing resource consumption relative to processing all available images. Predictions of classification labels based on information from multiple images/views of the points may be accumulated. The final label predictions may be determined based on processing with a fully connected conditional random field (CRF).

The same process (e.g., including a 3D to 2D projection) may be used to generate augmented images for training and for inference with a two dimensional convolutional neural network used to generate label predictions based on the augmented images. For example, a training point cloud may include points labeled with ground truth labels. These points may be projected onto training images and used with the associated ground truth labels for the projected points to train the two dimensional convolution neural network for semantic segmentation. Using the same process for training and inference may assure the same types of variations from the projection process are experienced in training and inference and thus improve the performance of the two dimensional convolution neural network for semantic segmentation.

Data from multiple lidar scans taken at different times and/or from different locations may be used to generate (e.g., using a bundle adjustment process) the point cloud. Information about whether objects reflected in the point cloud are moving may be available by comparing lidar scans from different times. For example, a probability that a point in the point cloud corresponds to moving or static (i.e., not moving) object may be determined based on intersection tests. A fully connected CRF may be applied to these motion probabilities (or other indications) to determine motion labels for points of the point cloud. These motion labels in the point cloud may be propagated (e.g., a channel of projected data) to an augmented image that is input to the two dimensional convolutional neural network and used for semantic segmentation to assist in distinguishing certain classes of objects that can be static or moving.

The predictions projected back to the point cloud may be improved by analyzing three dimensional clusters of points together. For example, a labeled point cloud may be segmented into clusters using a hierarchical segmentation running on a graphical processing unit (GPU). The point cloud may be represented as a graph split into connected components before applying hierarchical segmentation based on the Felzenszwalb algorithm to each connected component. The label predictions for the resulting clusters may be input to a three dimensional convolution neural network to determine a label prediction for the cluster as a whole, which may be propagated to the points in the cluster of the point cloud.

FIG. 1 is a block diagram of a system 100 for semantic labeling of point clouds using images. For example, the system 100 may implement the process 200 of FIG. 2. The system 100 takes as input a three dimensional point cloud 102 of data based, at least in part on, lidar sensor data reflecting objects in a space (e.g., the vicinity of segment of road). For example, the point cloud 102 may be determined by applying bundle adjustment processing (e.g., using a SLAM (Simultaneous Localization And Mapping) algorithm) to a set of lidar sensor scans taken at different times and/or locations within the space. The point cloud 102 may include data associated with points in the space, such as lidar intensity and/or geometric features of collections of nearby points (e.g., a normal or spin). In some implementations, the point cloud 102 may include static/moving labels that indicate whether a point reflects a static object or a moving object. For example, static/moving labels may for points of the point cloud 102 may be determined by implementing the process 500 of FIG. 5. The system 100 also takes as input a set of two dimensional images 104 (e.g., greyscale images or color images) that include views of objects in the space. For example, the set of images 104 may be captured with one or more cameras or other image sensors (e.g., an array of cameras) operating in the same space as the lidar sensor. An image from the set of images 104 may be associated with a location and orientation of the image sensor (e.g., a camera) used to capture the image and/or a time when the image was captured. In some implementations, the point cloud 102 and the images 104 are based on data captured with sensors (e.g., lidar sensors, image sensors, global positioning system, etc.) mounted on a vehicle as the vehicle moves along a road.

The point cloud 102 and the set of images 104 are passed to the image selection module 106, which is configured to select a subset of the set of images 104 that provides multiple views of each of the points in the point cloud 102 while attempting to reduce the total number of images that will be processed by the downstream modules of the system 100. For example, image selection module 106 may implement the process 300 of FIG. 3. Once image selection module 106 has identified the subset of the set of images 104 that will be processed an image 108 from the subset may be passed to the 3D-2D projection module 110, along with the point cloud 102, for processing. For example, the image 108 may be similar to the image 1300 of FIG. 13. Selecting and processing multiple images captured from different locations with different views of objects reflected in the point cloud 102 may help to aggregate information to account for occlusion in some of the images.

The 3D-2D projection module 110 may determine a projection of points from the point cloud 102 onto the image 108. The position and orientation of an image sensor when it was used to capture the image 108 may be correlated (e.g., using a bundle adjustment algorithm such as SLAM) with a position and orientation in the point cloud 102 model of the space. For example, a projection may be determined by ray tracing to associate pixels of the image with the nearest points from the point cloud along respective rays from the image sensor location that are associated with the pixels. The projection may be a mapping that associates points in the point cloud 102 with pixels of the image 108. For example, the projection may be stored in a table. The 3D-2D projection module 110 may then use the projection to generate an augmented image 112 that includes one or more channels of data from the point cloud 102 (e.g., depth, normal, height, spin, lidar intensity, moving label, etc.) and one or more channels of data from the image 108 (e.g., red, green, blue, luminance, chrominance, etc.). Channel values of a point from the point cloud 102 may be assigned to a pixel of the image 108 (and a corresponding pixel of the augmented image 112) that is associated with the point by the projection. In some implementations, the channels of data from the point cloud 102 are stored in their final form as part of the point cloud 102 (e.g., lidar intensity or lidar variance may be stored for each point in the point cloud). In some implementations, channels of data from the point cloud 102 are derived from other data stored in the point cloud 102 by the 3D-2D module when generating the augmented image 112. For example, the depth of a point from the point cloud 102 may be determined based on a distance from the image sensor location associated with the image 108 to the position of the point. For example, the augmented image may include pixels stored in a format similar to the pixel data structure 810 of FIG. 8.

The augmented image 112, which includes information from the image 108 and from the point cloud 102, may be input to the 2D CNN semantic segmentation module 120 to obtain a semantic labeled image 122. The elements of the semantic labeled image 122 may include respective predictions regarding which classes from a set of classifications are likely to be associated with an object depicted in a corresponding pixel of the image 108 and an associated point of the point cloud 102. For example, an element of the semantic labeled image 122 may be stored in a format similar to the label prediction data structure 910 of FIG. 9. The 2D CNN semantic segmentation module 120 includes a two dimensional convolutional neural network that is trained to receive an augmented image 112 as input and output label predictions for pixels of the augmented image 112. The two dimensional convolutional neural network may be trained with augmented images generated in the same way as the augmented images processed during inference. For example, the 3D-2D projection module 110 may be used to generate augmented training images from a training point cloud, which has points associated with ground truth labels, and associated training images. For example, the process 400 of FIG. 4 may be implemented to train the two dimensional convolutional neural network of the 2D CNN semantic segmentation module 120.

The 2D-3D projection & accumulation module 130 maps predictions of the semantic labeled image 122 to respective points of the point cloud 102 to obtain a semantic labeled point cloud 132. The predictions of the semantic labeled image 122 may be mapped to associated points in the point cloud 102 by reversing the projection that was determined by the 3D-2D projection module 110 and used to generate the augmented image 112. For example, the projection may be retrieved from memory where it was stored (e.g., as table associating pixels with points) by the 3D-2D projection module 110. Multiple views of a point in the point cloud 102 may be available in the subset of the set of images 104 selected for processing, so the 2D-3D projection & accumulation module 130 may accumulate predictions for the point derived from these different views of the point. For example, predictions for a point may be accumulated by averaging predictions derived from different images in the subset. For example, predictions for a point may be accumulated by determining an elementwise maximum of the predictions derived from different images in the subset. For example, predictions for a point may be accumulated by storing multiple predictions for a point in a list of predictions associated with the point. The resulting labeled point cloud 132 includes points from the point cloud 102 that are associated with a respective semantic prior (e.g., a label prediction or an accumulation of label predictions).

The labeled point cloud 132 may be processed to exploit three dimensional structure of the semantic priors using the 3D segmentation module 140 and the 3D CNN classification module 150. The 3D segmentation module 140 analyzes points in the labeled point cloud 132 to identify clusters of points and outputs the 3D semantic priors by clusters 142, which is a list of clusters for the labeled point cloud 132 that include a set of semantic priors for each of the clusters. For example, the 3D semantic priors by clusters 142 may be stored in the cluster list data structure 1010 of FIG. 10. For example, Felzenszwalb segmentation may be performed for connect components of a graph with nodes corresponding to points of the point cloud to determine the clusters. For example, the process 600 of FIG. 6 may be implemented by the 3D segmentation module 140 to determine the 3D semantic priors by clusters 142.

The 3D CNN classification module 150 includes a three dimensional convolutional neural network that takes a three dimensional array of predictions for a cluster (e.g., based on the 3D semantic priors for the cluster) as input and outputs a label prediction for the cluster as a whole. The 3D cluster label predictions 152 that result from processing the clusters of the labeled point cloud 132 with the 3D CNN classification module 150 may be used to update 3D semantic priors of the labeled point cloud 132. For example, the 3D cluster label predictions 152 may be stored in the cluster list data structure 1010 of FIG. 10. The cluster prediction update module 156 may update the labeled point cloud 132 by assigning the cluster label predictions to their associated points in the labeled point cloud 132. For example, the 3D CNN classification module 150 and the cluster prediction update module 156 may collectively implement the process 700 of FIG. 7.

A fully-connected CRF module 160 may process the labeled point cloud 132 using a fully connect conditional random field (CRF) to refine the labels for points. The resulting labeled point cloud 162 may include refined label predictions for each point of the point cloud 102. In some implementations, the label predictions of the labeled point cloud 162 are quantized to select a single most likely class or label for a respective point. For example, the largest element of the prediction vector may be rounded to one and all other elements of the prediction may be rounded to zero or a more compact representation (an integer with different values representing different labels) for the most likely classification may be used.

The labeled point cloud 162 may be processed by the label fusion module 170, which takes labels for objects in the space represented by the point cloud 102 that have been determined by other classification systems outside of the system 100 (e.g., a sign detection a classification system or a road segmentation and lane marking recognition system), which may run in parallel with the system 100, and fuses these labels from other systems with the labels generated by the system 100. The resulting fused labeled point cloud 172 may incorporate labels generated by system 100 and external systems. For example, an externally generated classification for a road sign may override the classification for this object associated with the points of the object in the labeled point cloud 162. For example, a priority scheme that depends on the classifications determined by the system 100 and other object recognition systems may be used by the label fusion module 170 to resolve conflicts in classification.

In some implementations, multiple labels from different systems for a point may be stored together in the fused labeled point cloud 172.

Figure 11:
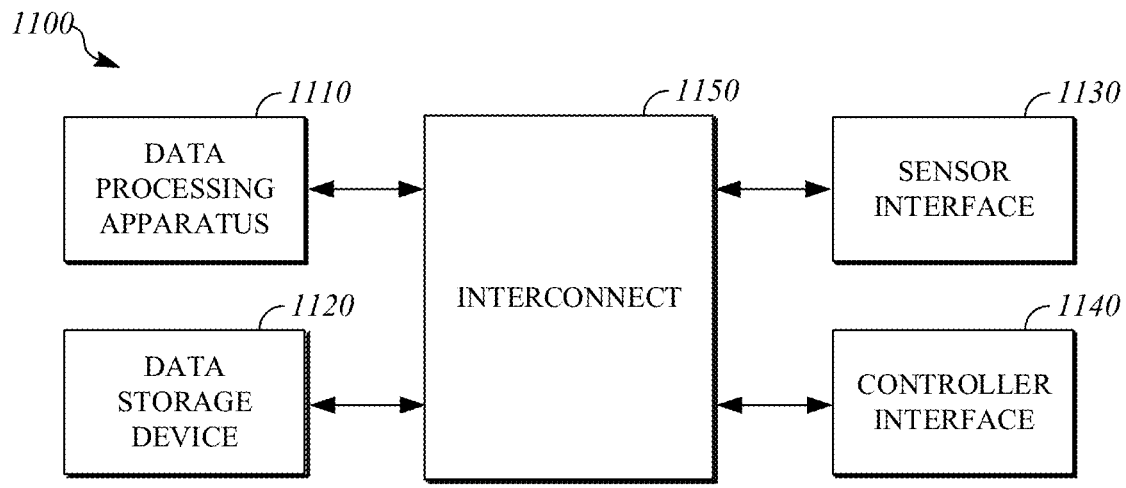
FIG. 11 is a block diagram of an example of a hardware configuration for a vehicle controller.
Figure 12:
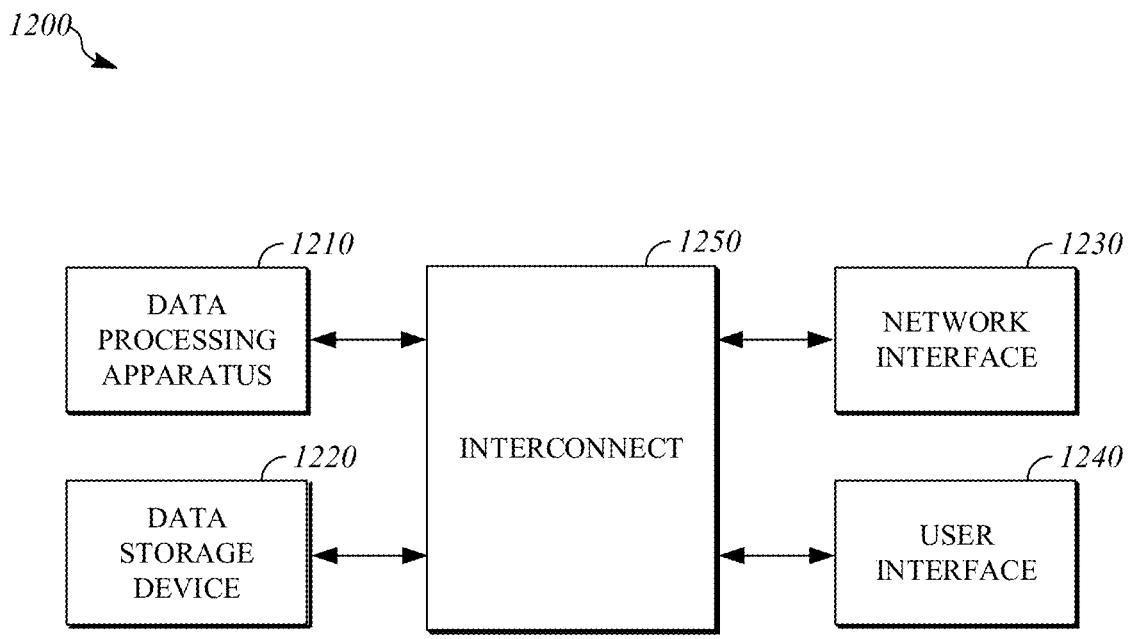
FIG. 12 is a block diagram of an example of a hardware configuration of a computing device.

The system 100 may be implemented by a computing device (e.g., the computing system 1200 of FIG. 12). In some implementations, the system 100 may be implemented by a vehicle and a resulting labeled point cloud (e.g., 132, 162, or 172) may be used by an automated vehicle controller to assist in navigation and/or motion planning. For example, a vehicle controller (e.g., the vehicle controller 1100 of FIG. 11) may be used to implement the system 100. The modules of the system 100 may implemented in hardware, software, or a combination of hardware and software. For example, the modules of the system 100 may implemented using software embodied in a non-transitory computer-readable storage medium including program instructions executable by one or more processors that, when executed, cause the one or more processors to perform operations.

Figure 2:
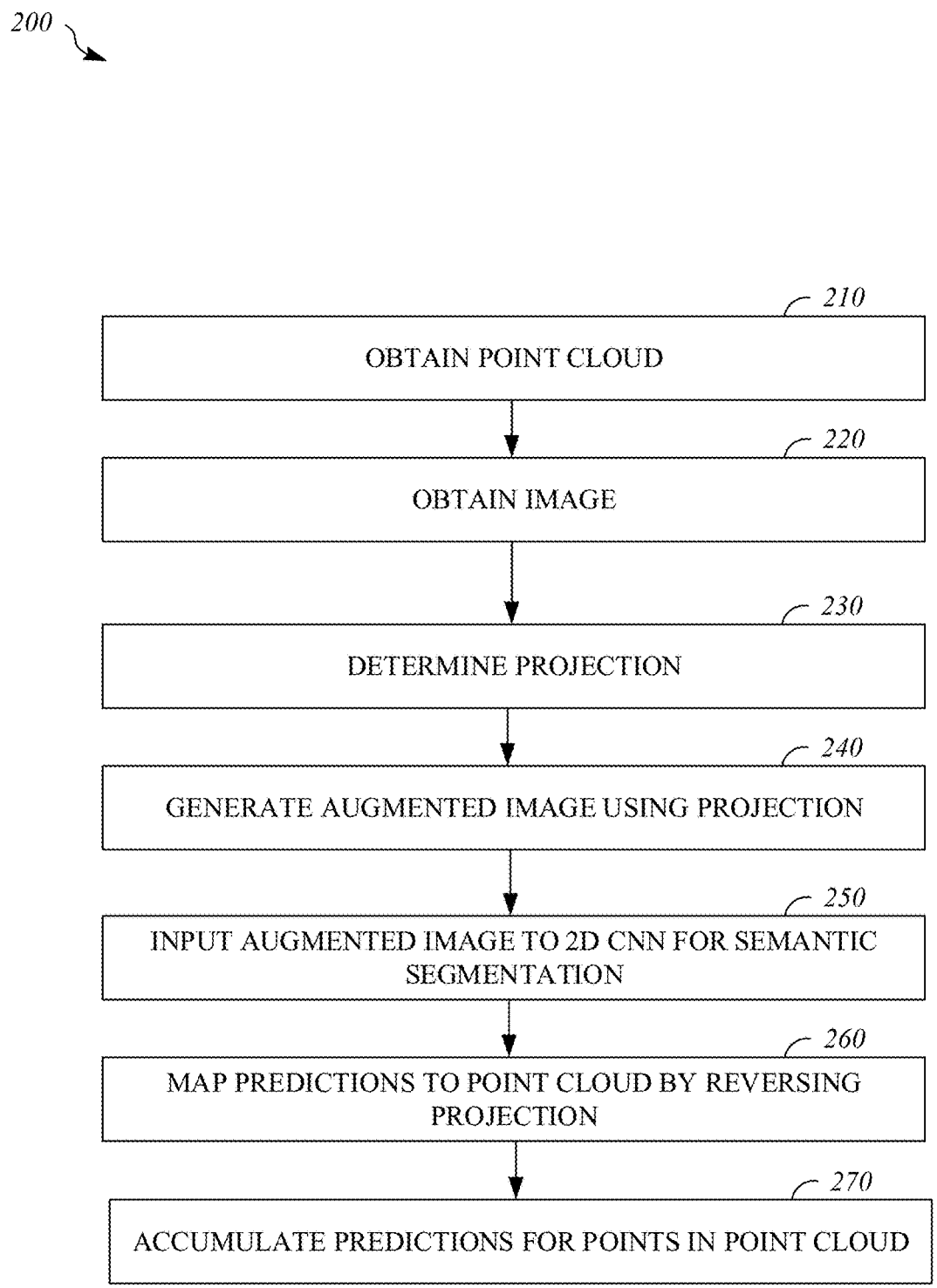
FIG. 2 is a flowchart of an example process for semantic labeling of point clouds using images.

FIG. 2 is a flowchart of an example process 200 for semantic labeling of point clouds using images. The process 200 includes obtaining a point cloud that is based on lidar data reflecting one or more objects in a space; obtaining an image that includes a view of at least one of the one or more objects in the space; determining a projection of points from the point cloud onto the image; generating, using the projection, an augmented image that includes one or more channels of data from the point cloud and one or more channels of data from the image; inputting the augmented image to a two dimensional convolutional neural network to obtain a semantic labeled image wherein elements of the semantic labeled image include respective predictions; mapping, by reversing the projection, predictions of the semantic labeled image to respective points of the point cloud to obtain a semantic labeled point cloud; and accumulating predictions for points in the point cloud with predictions based on additional images of objects in the space. For example, the process 200 may be implemented by the system 100 of FIG. 1. For example, the process 200 may be implemented by the vehicle controller 1100 of FIG. 11. For example, the process 200 may be implemented by the computing system 1200 of FIG. 12.

The process 200 includes obtaining 210 a point cloud, in three spatial dimensions, that is based on lidar data reflecting one or more objects in a space. For example, the point cloud may be obtained 210 by reading the point cloud data from memory (e.g., from the data storage device 1120 or the data storage device 1220) or receiving the point cloud data in communications received via a computing network (e.g., received via the network interface 1230). For example, the point cloud may be the point cloud 102 of FIG. 1. For example, the point cloud may be determined by applying bundle adjustment processing (e.g., using the SLAM (Simultaneous Localization And Mapping) algorithm) to a set of lidar sensor scans taken at different times and/or locations within the space. The point cloud may include data associated with points in the space, such as lidar intensity and/or geometric features of collections of nearby points (e.g., a normal or spin). In some implementations, the point cloud may include static/moving labels that indicate whether a point reflects a static object or a moving object. For example, static/moving labels for points of the point cloud may be determined by implementing the process 500 of FIG. 5. In some implementations, the point cloud is based on data captured with sensors (e.g., lidar sensors, image sensors, global positioning system, accelerometers, gyroscopes, magnetometers, etc.) mounted on a vehicle as the vehicle moves along a road. For example, the sensor interface 1130 of the vehicle controller 1100 may be used to obtain 210 lidar sensor data and/or other sensor data used to determine the point cloud.

The process 200 includes obtaining 220 an image, in two spatial dimensions, that includes a view of at least one of the one or more objects in the space. For example, the image may be obtained 220 by reading the image data from memory (e.g., from the data storage device 1120 or the data storage device 1220) or receiving the image data in communications received via a computing network (e.g., received via the network interface 1230). For example, the image may be the image 108 of FIG. 1. In some implementations, the image is one of multiple images in a subset of a larger set of available images that are selected to provide multiple views of points in the point cloud. For example, a set of images associated with different respective camera locations may be searched to identify a subset of images that includes at least two images with views of each point in the point cloud, and the image may be obtained 220 from this subset of images. For example, the image may be selected by searching using the process 300 of FIG. 3. For example, the image may be a grayscale image or a color image (e.g., encoded in a three channel RGB or YCrCb format). For example, the image may be captured with a cameras or other image sensor (e.g., a camera in an array of cameras mounted on a vehicle) operating in the same space as a lidar sensor used to capture data for the point cloud. The image may be associated with a location and orientation of the image sensor (e.g., a camera) used to capture the image and/or a time when the image was captured. In some implementations, the image is based on data captured with an image sensor mounted on a vehicle as the vehicle moves along a road. For example, the sensor interface 1130 of the vehicle controller 1100 may be used to obtain 220 the image.

The process 200 includes determining 230 a projection of points from the point cloud onto the image. The position and orientation of an image sensor when it was used to capture the image may be correlated (e.g., using a bundle adjustment algorithm such as SLAM) with a position and orientation in the point cloud model of the space. For example, a projection may be determined by ray tracing to associate pixels of the image with the nearest points from the point cloud along respective rays from the image sensor location that are associated with the pixels. The projection may be a mapping that associates points in the point cloud with pixels of the image. For example, the projection may be stored in a table (e.g., stored in the data storage device 1120 or the data storage device 1220). For example, the projection may be determined 230 by the 3D-2D projection module 110 of FIG. 1.

The process 200 includes generating 240, using the projection, an augmented image (e.g., the augmented image 112) that includes one or more channels of data from the point cloud (e.g., depth, normal, height, spin, lidar intensity, lidar variance, static/moving label, etc.) and one or more channels of data from the image (e.g., red, green, blue, luminance, chrominance, etc.). Channel values of a point from the point cloud may be assigned to a pixel of the image (and thus a corresponding pixel of the augmented image) that is associated with the point by the projection. In some implementations, the channels of data from the point cloud are stored in their final form as part of the point cloud (e.g., lidar intensity or lidar variance may be stored for each point in the point cloud). In some implementations, channels of data from the point cloud are derived from other data stored in the point cloud when generating 240 the augmented image. For example, the depth of a point from the point cloud may be determined based on a distance from the image sensor location associated with the image to the position of the point. In some implementations, the one or more channels of data from the point cloud that are included in the augmented image include at least one channel from amongst the set of depth, normal, height, lidar intensity, lidar variance, and spin. For example, the augmented image may include pixels stored in a format similar to the pixel data structure 810 of FIG. 8. In some implementations, a channel of the augmented image may be scaled to have dynamic range matching another channel of the augmented image. Scaling of channels in the augmented image(s) to equalize energy distribution across channels may facilitate efficient training and inference using a two dimension convolutional neural network for semantic segmentation. For example, the augmented image may be generated 240 by the 3D-2D projection module 110 of FIG. 1.

The process 200 includes inputting 250 the augmented image to a two dimensional convolutional neural network to obtain a semantic labeled image (e.g., the semantic labeled image 122) wherein elements of the semantic labeled image include respective predictions. The predictions may indicate which labels from a set of classification labels are likely to be associated with an object depicted in a corresponding pixel of the image and an associated point of the point cloud. A prediction for a pixel of the semantic labeled image may be a vector of probabilities, with each component of the vector corresponding to one member of the set of classification labels. In some implementations, the components of a prediction are proportional to estimated probabilities of a corresponding label applying to the pixel (e.g., the vector may not be normalized in some circumstances). For example, an element of the semantic labeled image may be stored in a format similar to the label prediction data structure 910 of FIG. 9. The two dimensional convolutional neural network may be trained to receive an augmented image as input and output label predictions for pixels of the augmented image. The two dimensional convolutional neural network may be trained with augmented images generated 240 in the same way as the augmented images processed during inference. For example, the 3D-2D projection module 110 of FIG. 1 may be used to generate augmented training images from a training point cloud, which has points associated with ground truth labels, and associated training images. For example, the process 400 of FIG. 4 may be implemented to train the two dimensional convolutional neural network. For example, the 2D CNN semantic segmentation module 120 of FIG. 1 may input 250 the augmented image to the two dimensional convolutional neural network to obtain the semantic labeled image.

The process 200 includes mapping 260, by reversing the projection, predictions of the semantic labeled image to respective points of the point cloud to obtain a semantic labeled point cloud (e.g., the labeled point cloud 132). The predictions of the semantic labeled image may be mapped to associated points in the point cloud by reversing the projection that was previously determined 230 and used to generate 240 the augmented image. For example, the projection may be retrieved from data storage (e.g., from the data storage device 1120 or the data storage device 1220) where it was stored (e.g., as table associating pixels with points). The predictions mapped 260 to respective points of the point cloud may be stored as part of data structure for respective points in the semantic labeled point cloud. For example, the predictions of the semantic labeled image may be mapped 260 to the respective points of the point cloud by the 2D-3D projection & accumulation module 130 of FIG. 1.

The process 200 includes accumulating 270 predictions for points in the labeled point cloud. The current image may be one of multiple images processed in this manner and multiple views of a point in the point cloud may be available in different semantic labeled images based on different images, so predictions for the point derived from these different views of the point may be accumulated 270. For example, predictions for a point may be accumulated by averaging predictions derived from different images in the subset. For example, predictions for a point may be accumulated by determining an elementwise maximum of the predictions derived from different images in the subset. For example, predictions for a point may be accumulated by storing multiple predictions for a point in a list of predictions associated with the point. The resulting labeled point cloud may include points from the point cloud that are associated with a respective semantic prior (e.g., a label prediction or an accumulation of label predictions). For example, the predictions of the semantic labeled image may be accumulated 270 for the respective points of the point cloud by the 2D-3D projection & accumulation module 130 of FIG. 1.

For example, the image may be a first image and the semantic labeled image may be a first semantic labeled image. A second image (e.g., from a subset of available images selected for processing), in two spatial dimensions, that includes a view of the at least one of the one or more objects in the space may be obtained 220. A second semantic labeled image may be determined based on the second image augmented with data from the point cloud. Predictions of the second semantic labeled image may be mapped 260 to respective points of the point cloud. Predictions from the first semantic labeled image and from the second semantic labeled image may be accumulated 270 for at least one point of the semantic labeled point cloud.

In some implementations (not shown in FIG. 2), the process 200 may be modified or expanded to perform additional processing on the semantic labeled point cloud to enhance or refine the label predictions associated with the points of the semantic labeled point cloud. For example, the process 200 may be modified to include applying a fully connected conditional random field to the predictions of the semantic labeled point cloud to refine the predictions (e.g., as described in relation to the fully-connected CRF 160 of FIG. 1).

Figure 3:
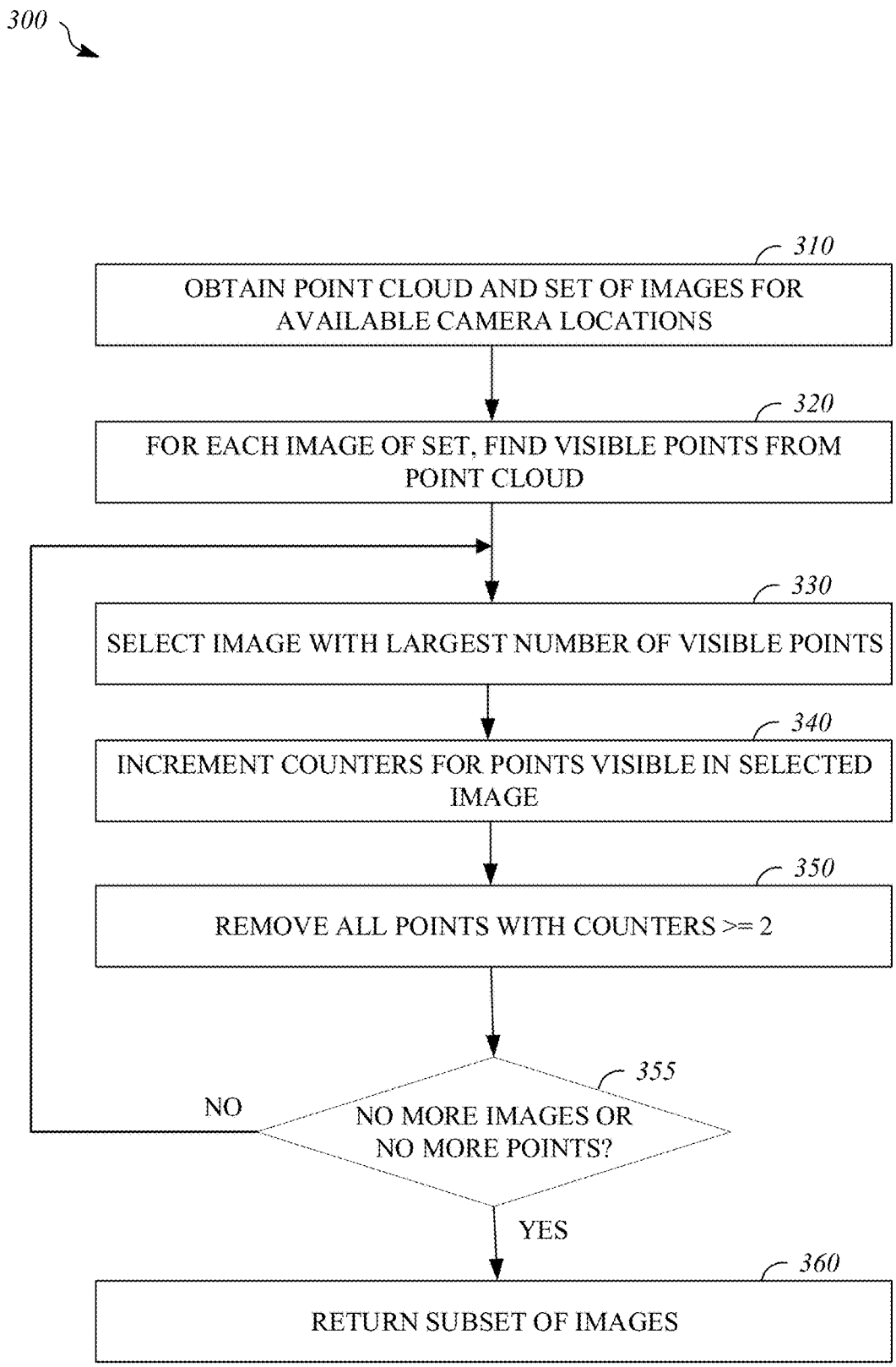
FIG. 3 is a flowchart of an example process for selecting images for use in semantic segmentation of a point cloud.

FIG. 3 is a flowchart of an example process 300 for selecting images for use in semantic segmentation of a point cloud. Using the process 300 may be used to search a set of images associated with different respective camera locations to identify a subset of images that includes at least two images with views of each point in a point cloud. Instead of using all available camera locations, using process 300 may significantly reduce the consumption of computing resources (e.g., processing time and/or memory usage) in later processing of the images for semantic segmentation of the point cloud without substantially degrading the quality of the semantic segmentation. For example, the process 300 may be implemented by the image selection module 106 of FIG. 1. For example, the process 300 may be implemented by the vehicle controller 1100 of FIG. 11. For example, the process 300 may be implemented by the computing system 1200 of FIG. 12.

The process 300 includes obtaining 310 a point cloud and a set of available images captured from multiple camera locations; for each image of the set, finding 320 visible points from the point cloud. The process 300 includes iteratively selecting 330 a remaining available image with the largest number of visible points; incrementing 340 counters for points visible in the selected image; and remove 350 all points with counter values greater than or equal to 2 from the lists of visible points for the remaining available images; until (at 355) there are no more remaining available images or there are no more points. The process 300 then returns 360 the images that have been selected 330 as the subset of the set of available images to be processed for semantic segmentation of the point cloud.

Note that the cameras (e.g., 2D RGB cameras) used to capture the images and the lidar sensors used to collect data for the point cloud may be mounted at different places on a collection platform (e.g., a vehicle). As a result, it is possible that some 3D points collected from the lidar sensors cannot be viewed in the available images from the available camera locations. So it is possible that some points in the 3D point cloud have counters with values 0 after the process 300 is completed.

Figure 4:
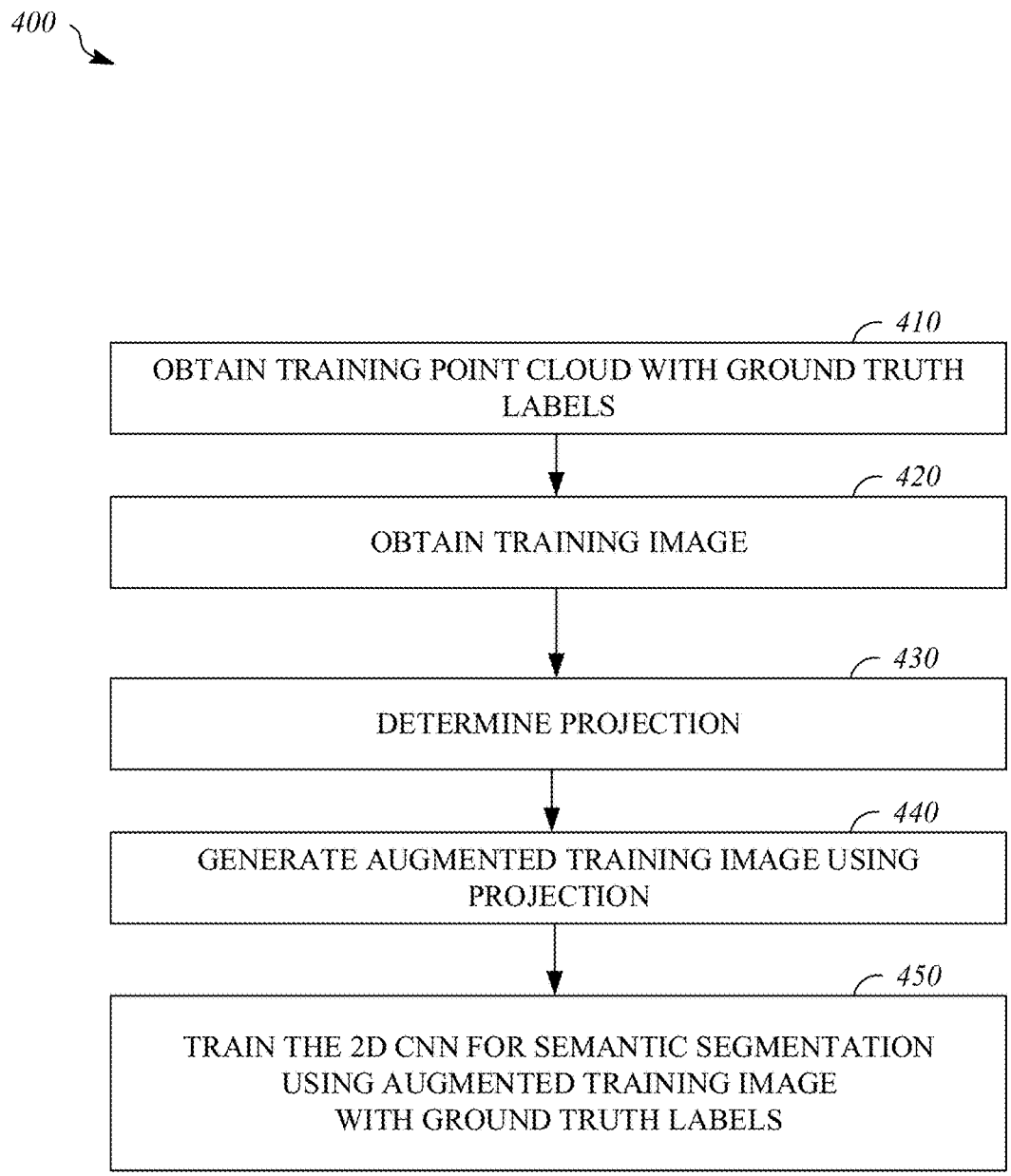
FIG. 4 is a flowchart of an example process for training a two dimensional convolutional neural network for semantic segmentation using an image augmented with information from a point cloud.

FIG. 4 is a flowchart of an example process 400 for training a two dimensional convolutional neural network for semantic segmentation using an image augmented with information from a point cloud. The two dimensional convolutional neural network may be trained with augmented images generated in the same way as the augmented images processed during inference. Using the same technique to generate the augmented images during training and inference may assure the same types of projection noise are encountered, which may improve semantic segmentation performance.

The process 400 includes obtaining 410 a training point cloud that includes points labeled with ground truth labels; obtaining 420 a training image, in two spatial dimensions, that includes a view of at least one object that is reflected in the training point cloud; determining 430 a projection of points from the training point cloud onto the training image; generating 440, using the projection, an augmented training image that includes one or more channels of data from the training point cloud and one or more channels of data from the training image; and training 450 the two dimensional convolutional neural network using the augmented training image and corresponding ground truth labels for projected points from the training point cloud. In some implementations, the two dimensional convolutional neural network may be trained (e.g., via backpropagation) using a loss function that includes a term that is a function of depth. For example, depth value may be multiplied with semantic segmentation cost pixel-wise in the loss function. For example, the process 400 may be implemented by the system 100 of FIG. 1. For example, the process 400 may be implemented by the vehicle controller 1100 of FIG. 11. For example, the process 400 may be implemented by the computing system 1200 of FIG. 12.

Figure 5:
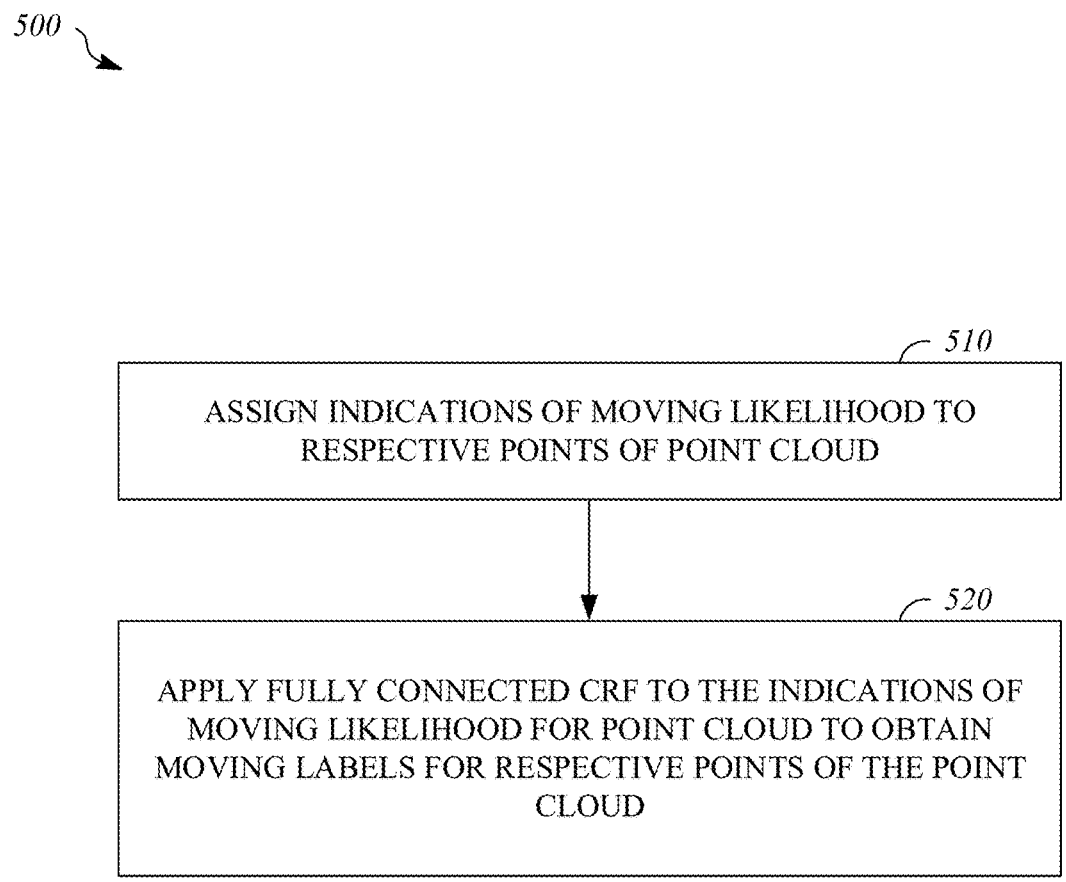
FIG. 5 is a flowchart of an example process for determining moving labels for points of a point cloud.

FIG. 5 is a flowchart of an example process 500 for determining moving labels for points of a point cloud. In some implementations, a point cloud may be determined using a bundle adjustment process based on lidar scans captured at a plurality of locations and times. These scans taken at different times may provide information showing that some points correspond to moving objects (e.g., where a point found in one scan is not found at the same location in another scan taken at a different time. For each point in a point cloud, there was at least one a ray shooting from the Lidar sensor (source) to the location of the point (destination). Physically, a ray may not be collected when there are some points lying very close to or on the middle of the ray as these points represent an obstacle blocking the destination. For example, this blocking phenomenon can happen in two cases: 1) where the blocking points belong to semi-transparent objects, where the semi-transparent objects are observed at the same time as the destination point; or 2) where the blocking points belong to moving objects, where the moving objects are observed at different time from the destination point. Given these observations, points of a point cloud may be assigned a moving cost based on how frequently they have been observed as moving object points. A fully connected Conditional Random Field (CRF) may be performed on the moving costs for the points to determine a moving label (e.g., a binary label 0/1 (static/moving)).

The process 500 includes assigning 510 indications of moving likelihood to respective points of the point cloud based on how frequently the respective points are detected in lidar scans captured at different times; and applying 520 a fully connected conditional random field to the indications of moving likelihood for points in the point cloud to obtain moving labels for respective points of the point cloud. The moving labels may be binary indications of whether or not a respective point of the point cloud corresponds to a moving object (e.g., moving vs. static). The moving labels may be included in an augmented image as one of one or more channels of data from the point cloud. For example, the process 500 may be implemented by the system 100 of FIG. 1. For example, the process 500 may be implemented by the vehicle controller 1100 of FIG. 11. For example, the process 500 may be implemented by the computing system 1200 of FIG. 12.

Figure 6:
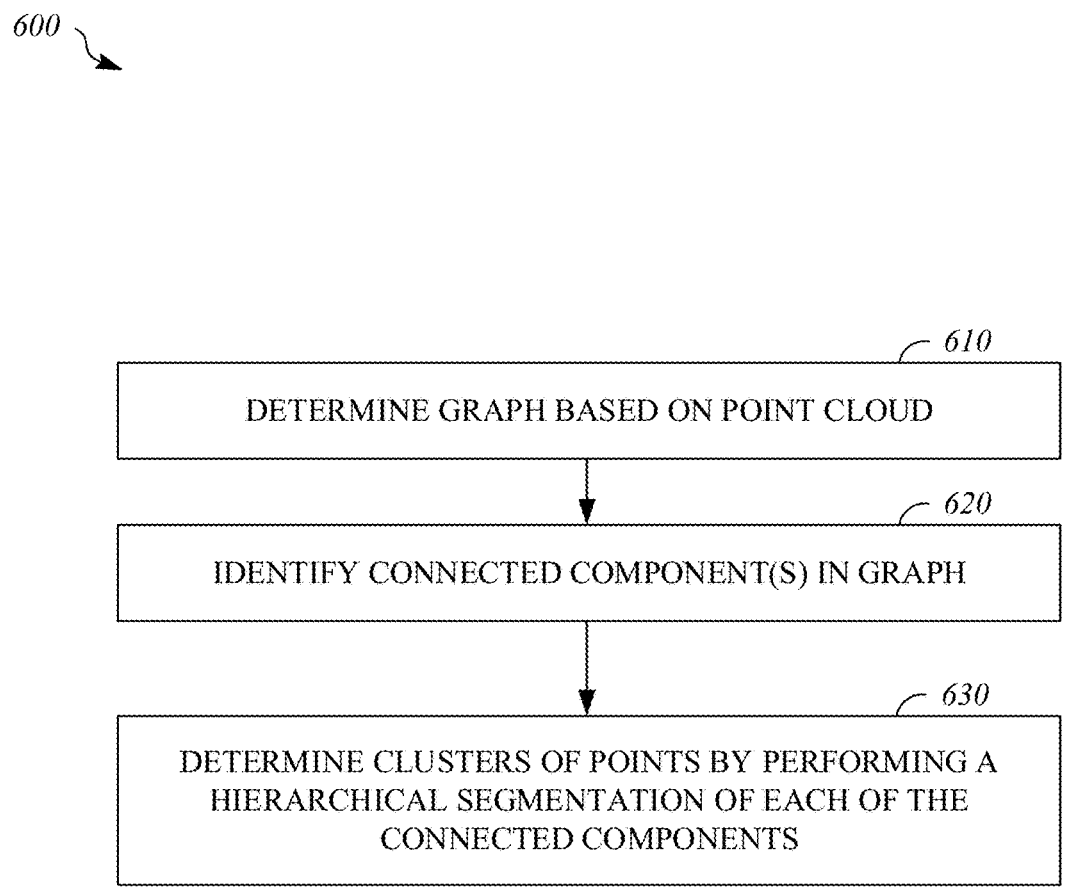
FIG. 6 is a flowchart of an example process for three dimensional segmentation of a point cloud into clusters.

FIG. 6 is a flowchart of an example process 600 for three dimensional segmentation of a point cloud into clusters. The process 600 includes determining 610 a graph based on a semantic labeled point cloud, wherein nodes of the graph are points from the semantic labeled point cloud and edges of the graph connect nodes with respective points that satisfy a pairwise criteria; identifying 620 one or more connected components of the graph; and determining 630 clusters of points from the semantic labeled point cloud by performing a hierarchical segmentation of each of the one or more connected components of the graph. For example, the process 600 may be implemented with a graphical processing unit (GPU) to exploit the highly parallel nature of the calculations. For example, the process 600 may be implemented by the system 100 of FIG. 1. For example, the process 600 may be implemented by the vehicle controller 1100 of FIG. 11. For example, the process 600 may be implemented by the computing system 1200 of FIG. 12.

The process 600 includes determining 610 a graph based on the semantic labeled point cloud (e.g., the semantic labeled point cloud 132), wherein nodes of the graph are points from the semantic labeled point cloud and edges of the graph connect nodes with respective points that satisfy a pairwise criteria. Each of the points of the point cloud can be considered as a node in a graph, which can be connected to its k nearest neighborhood points through bidirectional edges. In some implementations, edges are defined with respective weights and only edges with weights that meet a threshold are created in the graph, i.e., the threshold on the weight may be the pairwise criteria satisfied by a pair of points whose nodes are connected by an edge in the graph. For example, edge weights may be defined as a difference (e.g., Diff(node1, node2) between a respective values (e.g., position, normals, colors, lidar intensity, etc.) for two points/nodes.

The process 600 includes identifying 620 one or more connected components of the graph. If any node within a subset of the nodes of this graph can find a path to any other node in the subset, then we regarded the group of points corresponding to this subset of the graph as a connected component. For a sparse point cloud, it may be advantageous to find connected components before applying segmentation processing. A reason for splitting into connected components is that some GPU based implementations require a fully connected point set so that during the bottom-up growing of clusters, each segment will be guarantee to have at least one edge connected to other segments.

The process 600 includes determining 630 clusters of points from the semantic labeled point cloud by performing a hierarchical segmentation of each of the one or more connected components of the graph. For example, Felzenszwalb segmentation may be performed for each connect component. A bottom-up algorithm may be performed in multiple iterations to create hierarchical segmentation levels. During each iteration, the segments generated from the level before is further grouped into larger segments, so on and so forth.

Figure 7:
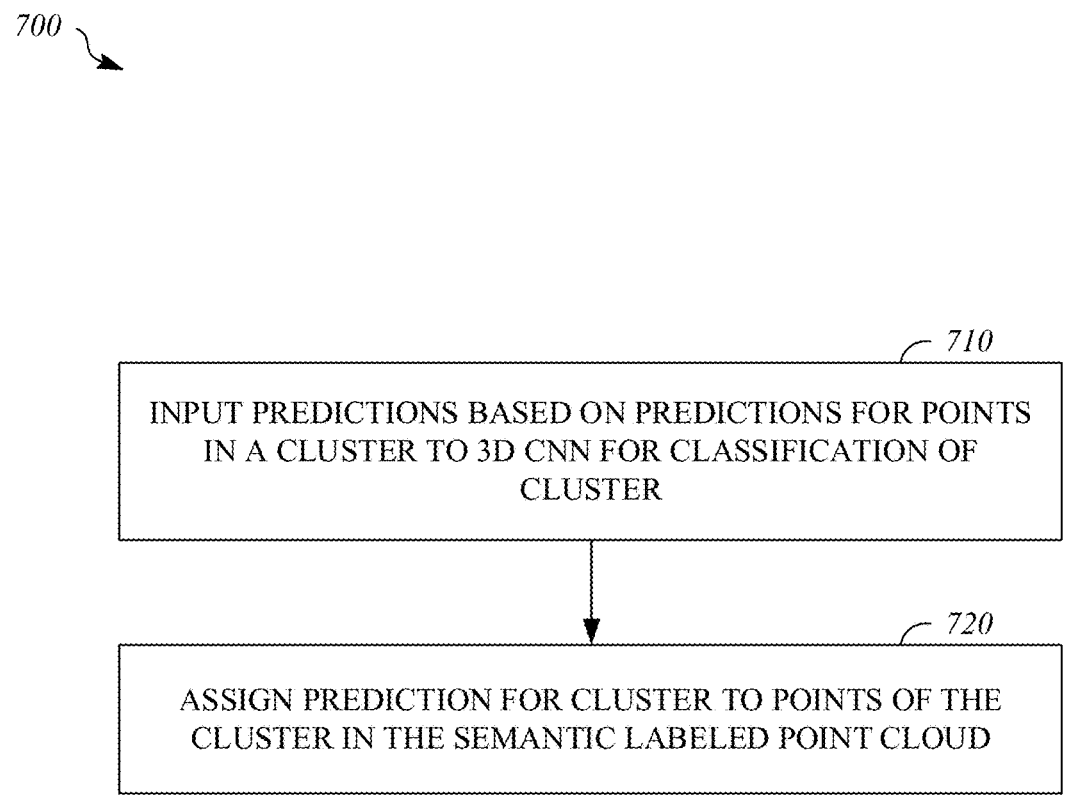
FIG. 7 is a flowchart of an example process for determining a label prediction for a cluster by inputting labels predictions for points of a cluster to a three dimensional convolutional neural network for classification.

FIG. 7 is a flowchart of an example process 700 for determining a label prediction for a cluster by inputting labels predictions for points of a cluster to a three dimensional convolutional neural network for classification. The process 700 includes inputting 710 predictions based on predictions for points of one of the clusters to a three dimensional convolutional neural network to obtain a prediction for the cluster; and assigning 720 the prediction for the cluster to all points of the cluster in the semantic labeled point cloud. The process 700 may be applied iteratively to each cluster in a list of clusters (e.g., the cluster list data structure 1010 of FIG. 10) for a labeled point cloud. For example, the process 700 may be implemented by the system 100 of FIG. 1. For example, the process 700 may be implemented by the vehicle controller 1100 of FIG. 11. For example, the process 700 may be implemented by the computing system 1200 of FIG. 12.

The process 700 includes inputting 710 predictions based on predictions for points of one of the clusters to a three dimensional convolutional neural network to obtain a prediction for the cluster. In some implementations, predictions input 710 to the three dimensional convolutional neural network are associated with respective voxels that collectively form a block centered at a center (e.g., a center of mass for equally weighted points) of the one of the clusters. Each voxel in the array may be assigned a prediction determined based on predictions of any points of the cluster occurring in that voxel or marked as empty if no points occur in the voxel. For example, the predictions input 710 to the three dimensional convolutional neural network are determined as an average of predictions for points located within a respective voxel. In some implementations, the voxels and the array of voxels have a fixed size for all clusters (e.g., 25 cm×25 cm×25 cm for each voxel and a 20×20×20 array of contiguous voxels to cover a 5 m×5 m×5 m space centered at the cluster center). The array of predictions for the voxels may be input 710 to the three dimensional convolutional neural network to obtain a prediction for the cluster.

Figure 8:
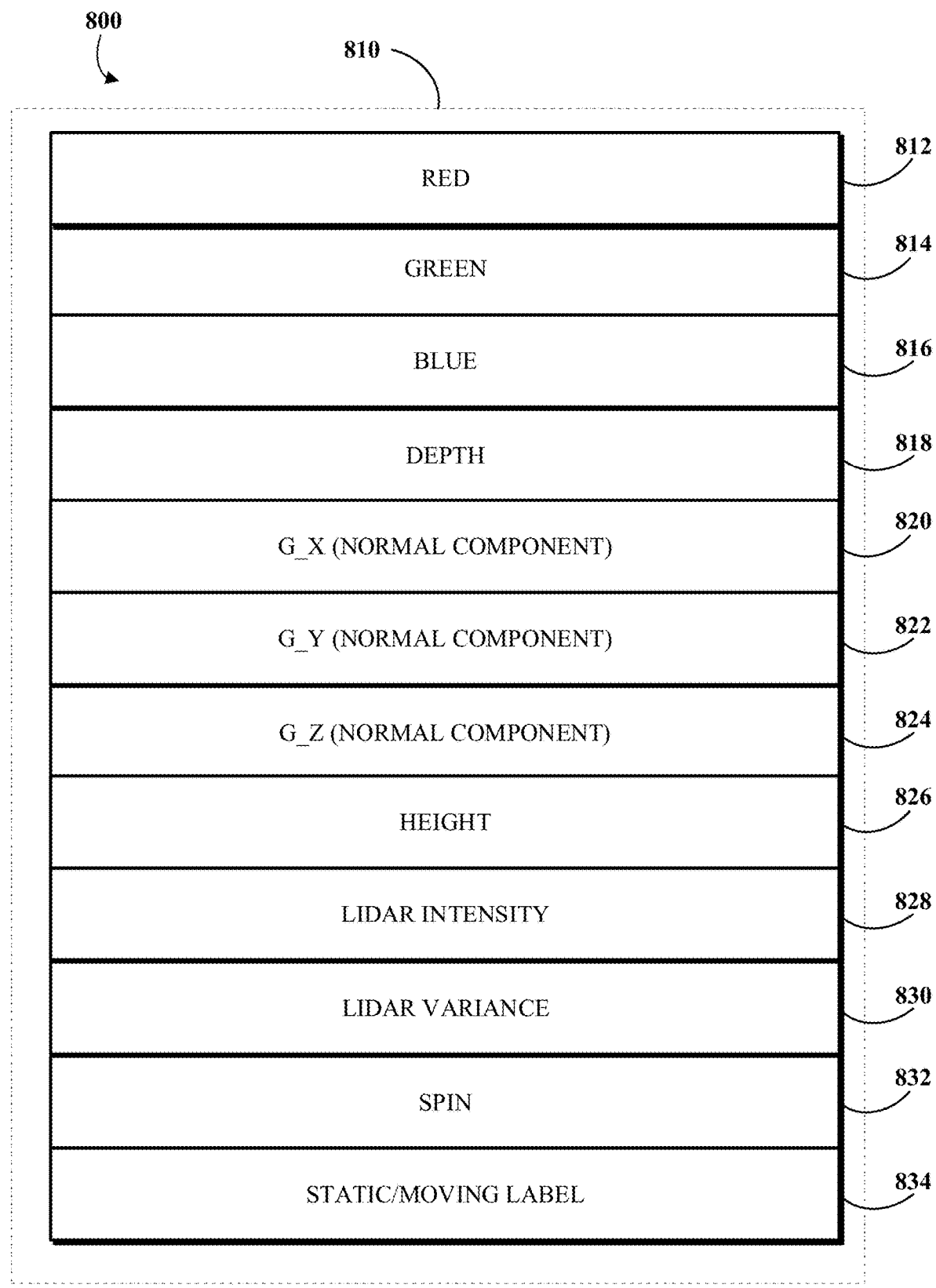
FIG. 8 is a memory map showing an example format for a pixel data structure that is a multi-channel element in in an augmented image that may be used for two dimensional semantic segmentation.

FIG. 8 is a memory map 800 showing an example format for a pixel data structure 810 that is a multi-channel element in in an augmented image that may be used for two dimensional semantic segmentation. The pixel data structure 810 includes fields 812 through 834 storing values for respective channels of data that are associated with this pixel at its position in the two dimensional augmented image. The pixel data structure 810 may be stored in memory or another type of data storage device (e.g., stored in the data storage device 1120 or the data storage device 1220).

The pixel data structure 810 includes a red field 812 storing a value of the red channel for the corresponding pixel from an input image. The pixel data structure 810 includes a green field 814 storing a value of the green channel for the corresponding pixel from an input image. The pixel data structure 810 includes a blue field 816 storing a value of the blue channel for the corresponding pixel from an input image.

The pixel data structure 810 includes a depth field 818 storing a value of the depth channel for the corresponding point from a point cloud that has been projected onto the corresponding pixel from an input image.

A normal to the surface at a point in the point cloud may be described by three-tuple ($G\_x$, $G\_y$, $G\_z$) specifying an orientation in the space of the point cloud. The pixel data structure 810 includes a $G\_x$ field 820 storing a value of a first normal component channel for the corresponding point from a point cloud that has been projected onto the corresponding pixel from an input image. The pixel data structure 810 includes a $G\_y$ field 822 storing a value of a second normal component channel for the corresponding point from a point cloud that has been projected onto the corresponding pixel from an input image. The pixel data structure 810 includes a $G\_z$ field 824 storing a value of a third normal component channel for the corresponding point from a point cloud that has been projected onto the corresponding pixel from an input image.

The pixel data structure 810 includes a height field 826 storing a value of a height channel for the corresponding point from a point cloud that has been projected onto the corresponding pixel from an input image. For example, the height may be defined in relation to a local ground plane identified in the space represented in the point cloud.

The pixel data structure 810 includes a lidar intensity field 828 storing a value of a lidar intensity channel for the corresponding point from a point cloud that has been projected onto the corresponding pixel from an input image. For example, the lidar intensity for a point of the point cloud may have been determined as an average of lidar intensity values from multiple lidar scans of the point that have been captured at different times and/or from different locations. The pixel data structure 810 includes a lidar variance field 830 storing a value of a lidar variance channel for the corresponding point from a point cloud that has been projected onto the corresponding pixel from an input image. For example, the lidar variance for a point of the point cloud may have been determined as an variance of lidar intensity values from multiple lidar scans of the point that have been captured at different times and/or from different locations.

The pixel data structure 810 includes a spin field 832 storing a value of a spin channel for the corresponding point from a point cloud that has been projected onto the corresponding pixel from an input image. For example, the spin for a point of the point cloud may have been determined as geometric features (e.g., as spin image) of points from the point cloud in the vicinity of the point in question.

The pixel data structure 810 includes a static/moving label field 834 storing a value of a static/moving label channel for the corresponding point from a point cloud that has been projected onto the corresponding pixel from an input image. For example, the static/moving label may have been determined based on multiple lidar scans captured at different times that were used to generate the point cloud. For example, the static/moving label may have been determined using the process 500 of FIG. 5.

Figure 9:
FIG. 9 is a memory map showing an example format for a label prediction data structure that is used for semantic segmentation.

FIG. 9 is a memory map 900 showing an example format for a label prediction data structure 910 that is used for semantic segmentation. The label prediction data structure 910 includes fields 912 through 934 storing estimate of likelihood for respective classification labels that are associated with this pixel at its position in the two dimensional semantic labeled image. For example, each of the fields 912-934 may store a component of a normalized probability vector. The label prediction data structure 910 may be stored in memory or another type of data storage device (e.g., stored in the data storage device 1120 or the data storage device 1220).

The label prediction data structure 910 includes a static car field 912 storing an estimate of likelihood that a static car label applies to the corresponding pixel/point; a dynamic car field 914 storing an estimate of likelihood that a dynamic car label applies to the corresponding pixel/point; a superimposed car field 916 storing an estimate of likelihood that a superimposed car label (e.g., indicating that a different cars occupy a same space (e.g., a parking space) for long disjoint periods of time) applies to the corresponding pixel/point; a road field 918 storing an estimate of likelihood that a road label applies to the corresponding pixel/point; a sidewalk field 920 storing an estimate of likelihood that a sidewalk label applies to the corresponding pixel/point; a median field 922 storing an estimate of likelihood that a median label applies to the corresponding pixel/point; a grass field 924 storing an estimate of likelihood that a grass label applies to the corresponding pixel/point; a tree field 926 storing an estimate of likelihood that a tree label applies to the corresponding pixel/point; a shrub field 928 storing an estimate of likelihood that a shrub label applies to the corresponding pixel/point; a building field 930 storing an estimate of likelihood that a building label applies to the corresponding pixel/point; a sign field 932 storing an estimate of likelihood that a sign label applies to the corresponding pixel/point; and a traffic light field 934 storing an estimate of likelihood that a traffic light label applies to the corresponding pixel/point.

Figure 10:
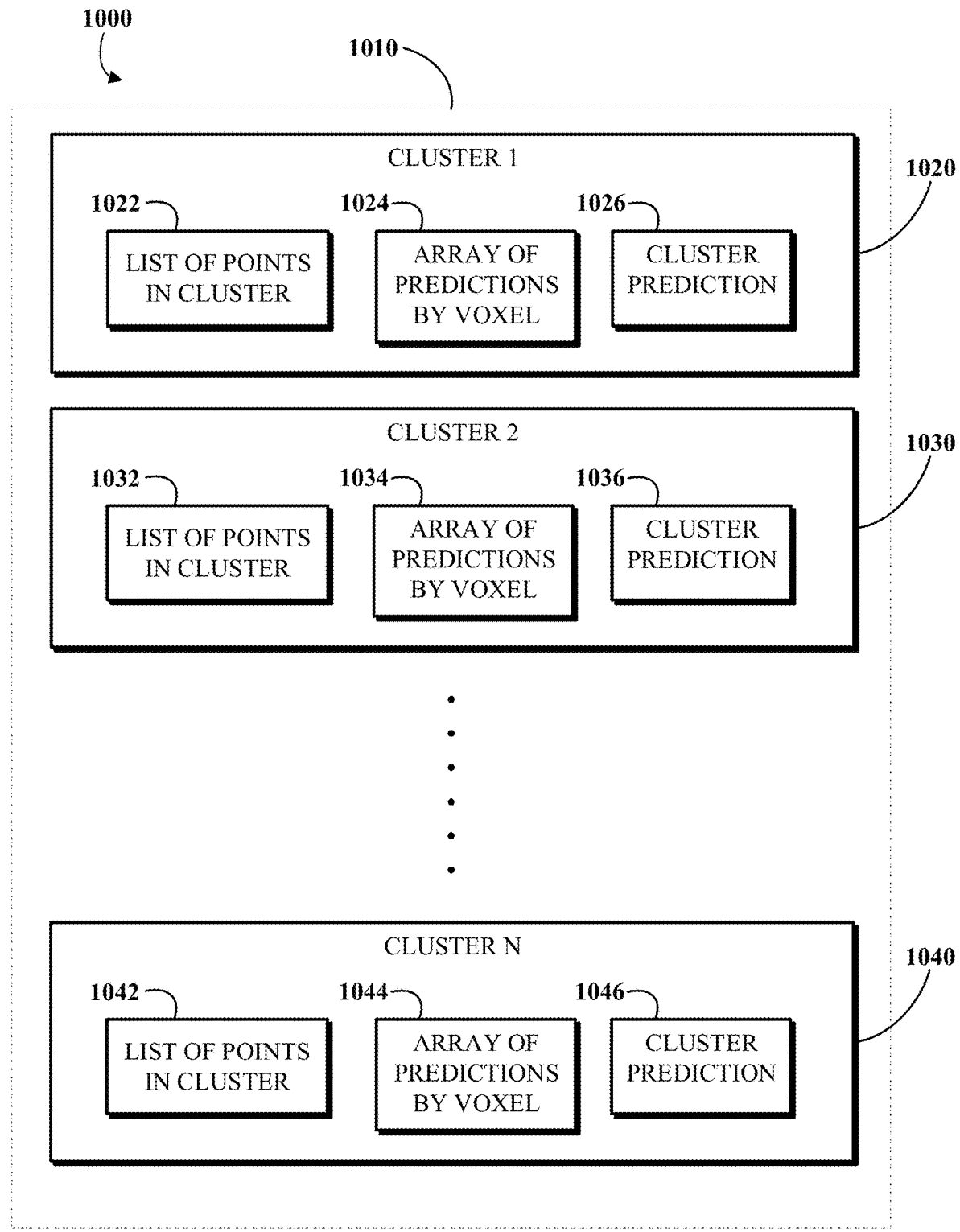
FIG. 10 is a memory map showing an example format for a cluster list data structure that is used for three dimensional segmentation and classification of clusters in a point cloud.

FIG. 10 is a memory map 1000 showing an example format for a cluster list data structure 1010 that is used for three dimensional segmentation and classification of clusters in a point cloud. The cluster list data structure 1010 includes values (e.g., 1020, 1030, and 1040) for each of N clusters of points identified in a labeled point cloud (e.g., the labeled point cloud 132). The cluster list data structure 1010 may be stored in memory or another type of data storage device (e.g., stored in the data storage device 1120 or the data storage device 1220).

Each cluster value (1020, 1030, 1040) includes a list of points (1022, 1032, 1042) in the respective cluster. This list of points may be determined by 3D segmentation processing (e.g., as described in relation to the 3D segmentation module 140 of FIG. 1).

In some implementations, predictions for a cluster are input to a three dimensional convolutional neural network for classification of the cluster. In this example, the predictions input to the three dimensional convolutional neural network are associated with respective voxels that collectively form a block centered at a center of the one of the clusters. Each cluster value (1020, 1030, 1040) includes an array of predictions by voxel (1024, 1034, 1044) for the respective cluster. The prediction for a voxel in one of the arrays of predictions by voxel (1024, 1034, 1044) may be determined based on the predictions for any points of the cluster that occur within the voxel. For example the predictions input to the three dimensional convolutional neural network are determined as an average of predictions for points located within a respective voxel. Empty voxels in an array of predictions by voxel (1024, 1034, 1044) may be marked with a flag indicating they are empty.

Each cluster value (1020, 1030, 1040) includes a cluster prediction (1026, 1036, 1046) for the respective cluster. The cluster prediction (1026, 1036, 1046) may be output from a 3D CNN classifier in response to inputting the corresponding array of predictions by voxel (1024, 1034, 1044) to the 3D CNN classifier (e.g., as described in relation to the 3D CNN classification module 150 of FIG. 1).

FIG. 11 is a block diagram of an example of a hardware configuration for a vehicle controller 1100. The hardware configuration may include a data processing apparatus 1110, a data storage device 1120, a sensor interface 1130, a controller interface 1140, and an interconnect 1150 through which the data processing apparatus 1110 may access the other components. For example, the vehicle controller 1100 may be configured to implement the modules of system 100 of FIG. 1. For example, the vehicle controller 1100 may be configured to implement the process 200 of FIG. 2.

The data processing apparatus 1110 is operable to execute instructions that have been stored in a data storage device 1120. In some implementations, the data processing apparatus 1110 is a processor with random access memory for temporarily storing instructions read from the data storage device 1120 while the instructions are being executed. The data processing apparatus 1110 may include single or multiple processors each having single or multiple processing cores. For example, the data processing apparatus 1110 may include a graphical processing unit (GPU). Alternatively, the data processing apparatus 1110 may include another type of device, or multiple devices, capable of manipulating or processing data. For example, the data storage device 1120 may be a non-volatile information storage device such as a hard drive, a solid-state drive, a read-only memory device (ROM), an optical disc, a magnetic disc, or any other suitable type of storage device such as a non-transitory computer readable memory. The data storage device 1120 may include another type of device, or multiple devices, capable of storing data for retrieval or processing by the data processing apparatus 1110. For example, the data storage device 1120 can be distributed across multiple machines or devices such as network-based memory or memory in multiple machines performing operations that can be described herein as being performed using a single computing device for ease of explanation. The data processing apparatus 1110 may access and manipulate data in stored in the data storage device 1120 via interconnect 1150. For example, the data storage device 1120 may store instructions executable by the data processing apparatus 1110 that upon execution by the data processing apparatus 1110 cause the data processing apparatus 1110 to perform operations (e.g., operations that implement the process 200 of FIG. 2).

The sensor interface 1130 may be configured to control and/or receive sensor data (e.g., three dimensional point clouds) from one or more sensors (e.g., lidar sensors, image sensors, accelerometers, gyroscopes, magnetometers, a global positioning system, etc.). In some implementations, the sensor interface 1130 may implement a serial port protocol (e.g., I2C or SPI) for communications with one or more sensor devices over conductors. In some implementations, the sensor interface 1130 may include a wireless interface for communicating with one or more sensor modules via low-power, short-range communications (e.g., using a vehicle area network protocol).

The controller interface 1140 allows input and output of information to other systems within a vehicle to facilitate automated control of the vehicle. For example, the controller interface 1140 may include serial ports (e.g., RS-232 or USB) used to issue control signals to actuators in the vehicle (e.g., a power source and transmission system, a steering system, and a braking system). For example, the interconnect 1150 may be a system bus, or a wired or wireless network (e.g., a vehicle area network).

FIG. 12 is a block diagram of an example of a hardware configuration of a computing system 1200. The hardware configuration may include a data processing apparatus 1210, a data storage device 1220, a network interface 1230, a user interface 1240, and an interconnect 1250 through which the data processing apparatus 1210 may access the other components. The computing device may be configured to perform semantic labeling of point clouds using images. For example, the computing system 1200 may be configured to implement the process 200 of FIG. 2.

The data processing apparatus 1210 is operable to execute instructions that have been stored in a data storage device 1220. In some implementations, the data processing apparatus 1210 is a processor with random access memory for temporarily storing instructions read from the data storage device 1220 while the instructions are being executed. The data processing apparatus 1210 may include single or multiple processors each having single or multiple processing cores. For example, the data processing apparatus 1210 may include a graphical processing unit (GPU). Alternatively, the data processing apparatus 1210 may include another type of device, or multiple devices, capable of manipulating or processing data. For example, the data storage device 1220 may be a non-volatile information storage device such as a hard drive, a solid-state drive, a read-only memory device (ROM), an optical disc, a magnetic disc, or any other suitable type of storage device such as a non-transitory computer readable memory. The data storage device 1220 may include another type of device, or multiple devices, capable of storing data for retrieval or processing by the data processing apparatus 1210. For example, the data storage device 1220 can be distributed across multiple machines or devices such as network-based memory or memory in multiple machines performing operations that can be described herein as being performed using a single computing device for ease of explanation. The data processing apparatus 1210 may access and manipulate data in stored in the data storage device 1220 via interconnect 1250. For example, the data storage device 1220 may store instructions executable by the data processing apparatus 1210 that upon execution by the data processing apparatus 1210 cause the data processing apparatus 1210 to perform operations (e.g., operations that implement the process 200 of FIG. 2).

The network interface 1230 facilitates communication with other devices, for example, a vehicle or server. For example, network interface 1230 may facilitate communication via a vehicle Wi-Fi network with a vehicle controller (e.g., the vehicle controller 1100 of FIG. 11). For example, network interface 1230 may facilitate communication via a WiMAX network with a vehicle at a remote location. For example, network interface 1230 may facilitate communication via a fiber optic network with a server at a remote location.

The user interface 1240 allows input and output of information from/to a user. In some implementations, the user interface 1240 can include a display, which can be a liquid crystal display (LCD), a cathode-ray tube (CRT), a light emitting diode (LED) display (e.g., an OLED display), or other suitable display. For example, the user interface 1240 may include a touchscreen. For example, the user interface 1240 may include a head-mounted display (e.g., virtual reality goggles or augmented reality glasses). For example, the user interface 1240 may include a positional input device, such as a mouse, touchpad, touchscreen, or the like; a keyboard; or other suitable human or machine interface devices. For example, the interconnect 1250 may be a system bus, or a wired or wireless network (e.g., a vehicle area network).

Figure 13:
FIG. 13 is greyscale copy of an example of an input image that may be used for semantic segmentation of points in a corresponding point cloud.

FIG. 13 is greyscale copy of an example of an input image 1300 that may be used for semantic segmentation of points in a corresponding point cloud. The image 1300 has been captured from an image sensor mounted on a vehicle moving along a road. A number of objects are visible in the image 1300.

Figure 14:
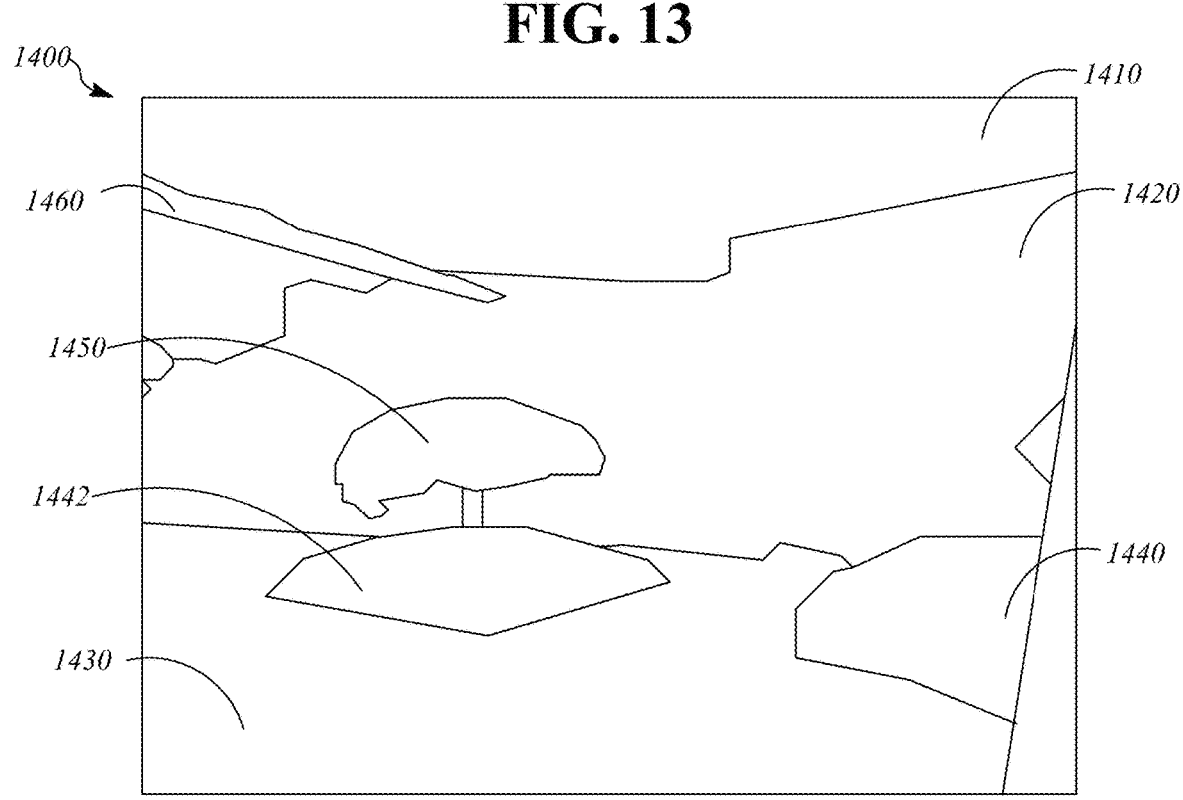
FIG. 14 is a sketch of an example of a semantic labeled image that may be used for semantic segmentation of points in a corresponding point cloud.

FIG. 14 is a sketch of an example of a semantic labeled image 1400 that may be used for semantic segmentation of points in a corresponding point cloud. The semantic labeled image 1400 was derived (e.g., by the system 100 of FIG. 1) from the image 1300 augmented with data from a point cloud that was projected on to the image. A visualization (e.g., selecting a color corresponding the classification estimated to be most likely for the pixel) of the values of the predictions for each pixel in the semantic labeled image 1400 reveals some discernable regions corresponding to different objects seen in the field of view of the image 1300. The region 1410 corresponds to the sky (empty space in the point cloud). The region 1420 corresponds to a building. The region 1430 corresponds to a road. The region 1440 corresponds to a static car. The region 1442 corresponds to a static car. The region 1450 corresponds to a tree. The region 1460 corresponds to a sign. These predictions in the semantic labeled image 1400 may then be mapped back to the corresponding points of the point cloud and the predictions for the points of the point cloud may continue to be improved through accumulation of predictions from multiple images, 3D segmentation and classification, application of a fully connected CRF, etc., as described in relation to FIG. 1.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system, comprising:
   a data processing apparatus; and
   a data storage device storing instructions executable by the data processing apparatus that upon execution by the data processing apparatus cause the data processing apparatus to perform operations comprising:
   obtaining a semantic labeled point cloud, wherein points of the semantic labeled point cloud include respective predictions for the points;
   determining a graph based on the semantic labeled point cloud, wherein nodes of the graph are points from the semantic labeled point cloud and edges of the graph connect nodes with respective points that satisfy a pairwise criteria;
   identifying one or more connected components of the graph; and determining clusters of points from the semantic labeled point cloud by performing a hierarchical segmentation of each of the one or more connected components of the graph.

2. The system of claim 1, wherein the operations comprise:
inputting predictions based on predictions for points of one of the clusters to a three dimensional convolutional neural network to obtain a prediction for the cluster; and
assigning the prediction for the cluster to all points of the cluster in the semantic labeled point cloud.

3. The system of claim 2, wherein the predictions input to the three dimensional convolutional neural network are associated with respective voxels that collectively form a block centered at a center of the one of the clusters, and wherein the predictions input to the three dimensional convolutional neural network are determined as an average of predictions for points located within a respective voxel.

4. The system of claim 1, wherein the operations comprise:
applying a fully connected conditional random field to the predictions of the semantic labeled point cloud to refine the predictions.

5. The system of claim 1, wherein the operations comprise:
determining a difference between respective values for two points from the semantic labeled point cloud; and
checking the difference meets a threshold to evaluate the pairwise criteria for the two points.

6. The system of claim 5, wherein the difference is between respective positions for the two points.

7. The system of claim 1, wherein the hierarchical segmentation is a Felzenszwalb segmentation.

8. A method comprising:
obtaining a semantic labeled point cloud, wherein points of the semantic labeled point cloud include respective predictions for the points;
determining a graph based on the semantic labeled point cloud, wherein nodes of the graph are points from the semantic labeled point cloud and edges of the graph connect nodes with respective points that satisfy a pairwise criteria;
identifying one or more connected components of the graph; and
determining clusters of points from the semantic labeled point cloud by performing a hierarchical segmentation of each of the one or more connected components of the graph.

9. The method of claim 8, comprising:
inputting predictions based on predictions for points of one of the clusters to a three dimensional convolutional neural network to obtain a prediction for the cluster; and
assigning the prediction for the cluster to all points of the cluster in the semantic labeled point cloud.

10. The method of claim 9, wherein the predictions input to the three dimensional convolutional neural network are associated with respective voxels that collectively form a block centered at a center of the one of the clusters, and wherein the predictions input to the three dimensional convolutional neural network are determined as an average of predictions for points located within a respective voxel.

11. The method of claim 8, comprising:
applying a fully connected conditional random field to the predictions of the semantic labeled point cloud to refine the predictions.

12. The method of claim 8, comprising:
determining a difference between respective values for two points from the semantic labeled point cloud; and
checking the difference meets a threshold to evaluate the pairwise criteria for the two points.

13. The method of claim 12, wherein the difference is between respective lidar intensities for the two points.

14. The method of claim 12, wherein the difference is between respective colors for the two points.

15. The method of claim 12, wherein the difference is between respective positions for the two points.

16. The method of claim 8, wherein the hierarchical segmentation is a Felzenszwalb segmentation.

17. A non-transitory computer-readable storage medium including program instructions executable by one or more processors that, when executed, cause the one or more processors to perform operations, the operations comprising:
determining a projection of points from a point cloud onto an image;
generating, using the projection, an augmented image that includes one or more channels of data from the point cloud and one or more channels of data from the image;
inputting the augmented image to a neural network to obtain a semantic labeled image, wherein elements of the semantic labeled image include respective predictions;
mapping, by reversing the projection, predictions of the semantic labeled image to respective points of the point cloud to obtain a semantic labeled point cloud; and
determining a graph based on the semantic labeled point cloud, wherein nodes of the graph are points from the semantic labeled point cloud and edges of the graph connect nodes with respective points that satisfy a pairwise criteria;
identifying one or more connected components of the graph; and
determining clusters of points from the semantic labeled point cloud by performing a hierarchical segmentation of each of the one or more connected components of the graph.

18. The non-transitory computer-readable storage medium of claim 17, wherein the image is a first image and the semantic labeled image is a first semantic labeled image, and further including program instructions executable by one or more processors that, when executed, cause the one or more processors to perform operations, the operations comprising:
determining a second semantic labeled image based on a second image augmented with data from the point cloud;
mapping predictions of the second semantic labeled image to respective points of the point cloud; and
accumulating predictions from the first semantic labeled image and from the second semantic labeled image for at least one point of the semantic labeled point cloud.

19. The non-transitory computer-readable storage medium of claim 17, further including program instructions executable by one or more processors that, when executed, cause the one or more processors to perform operations, the operations comprising:
searching a set of images associated with different respective camera locations to identify a subset of images that includes at least two images with views of each point in the point cloud; and
wherein the image is obtained from the subset of images.

20. The non-transitory computer-readable storage medium of claim 17, wherein the point cloud is determined using a bundle adjustment process based on lidar scans captured at a plurality of locations and times, and further including program instructions executable by one or more processors that, when executed, cause the one or more processors to perform operations, the operations comprising:
  assigning indications of moving likelihood to respective points of the point cloud based on how frequently the respective points are detected in lidar scans captured at different times;
  apply a fully connected conditional random field to the indications of moving likelihood for points in the point cloud to obtain moving labels for respective points of the point cloud, wherein the moving labels are binary indications of whether or not a respective point of the point cloud corresponds to a moving object; and
  wherein the moving labels are included in the augmented image as one of the one or more channels of data from the point cloud.

\* \* \* \* \*